US012798001B2

(12) United States Patent
Alvarez et al.

(10) Patent No.: US 12,798,001 B2
(45) Date of Patent: Nov. 17, 2026

(54) METHOD AND SYSTEM FOR HEATING USING AN ENERGY BEAM

(71) Applicant: ETXE-TAR, S.A., Elgoibar (ES)

(72) Inventors: Piera Alvarez, Elgoibar (ES); José Juan Gabilondo, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 1320 days.

(21) Appl. No.: 17/618,034

(22) PCT Filed: May 28, 2020

(86) PCT No.: PCT/EP2020/064891
§ 371 (c)(1),
(2) Date: Dec. 10, 2021

(87) PCT Pub. No.: WO2020/249404
PCT Pub. Date: Dec. 17, 2020

(65) Prior Publication Data

US 2022/0258281 A1 Aug. 18, 2022

(30) Foreign Application Priority Data

Jun. 12, 2019 (EP) .................................... 19382488

(51) Int. Cl.
*B23K 26/082* (2014.01)
*C21D 1/09* (2006.01)
*C21D 1/34* (2006.01)

(52) U.S. Cl.
CPC .............. *B23K 26/082* (2015.10); *C21D 1/09* (2013.01); *C21D 1/34* (2013.01)

(58) Field of Classification Search
CPC ...... B23K 26/082; B23K 26/352; C21D 1/09; C21D 1/34; C21D 1/38; C21D 2221/00
See application file for complete search history.

(56) References Cited

U.S. PATENT DOCUMENTS 10,688,561 B2 * 6/2020 Diaz ..................... B29C 64/153
10,864,603 B2 * 12/2020 Sancho Diaz ....... B23K 26/082
(Continued)

FOREIGN PATENT DOCUMENTS

CN 104822849 A 8/2015
CN 106660123 A 5/2017
(Continued)

OTHER PUBLICATIONS

International Search Report issued Aug. 4, 2020 re: Application No. PCT/EP2020/064891 pp. 1-3, citing: US 2017/0239724 A1, US 2010/0126642 A1, US 2010/0126642 A1, US 2016/0288254 A1, US 2004/0253838 A1.
(Continued)

*Primary Examiner* — Woody A Lee, Jr.
*Assistant Examiner* — Abigail H Rhue
(74) *Attorney, Agent, or Firm* — CANTOR COLBURN LLP

(57) ABSTRACT

A method of heating a selected portion of an object includes the steps of projecting an energy beam onto a surface of the object and repetitively scanning the beam in accordance with a scanning pattern so as to establish an effective spot on the surface, and displacing the effective spot along a track to progressively heat a selected portion of the object. The selected portion has a first width at a first position along the track and a second width at a second position along the track. The second width is less than 75% of the first width.

The scanning pattern is repeated with a first frequency in correspondence with the first position and with a second frequency in correspondence with the second position, the second frequency being more than 60% and less than 140% of the first frequency.

19 Claims, 6 Drawing Sheets

(56) References Cited

U.S. PATENT DOCUMENTS

| | | | | |
|---|---|---|---|---|
| 11,047,019 | B2 * | 6/2021 | Sancho Díaz | C21D 1/09 |
| 11,491,577 | B2 * | 11/2022 | Gabilondo Peñalba | B23K 26/082 |
| 2004/0253838 | A1 | 12/2004 | Yamazaki et al. | |
| 2010/0126642 | A1 | 5/2010 | Brenner et al. | |
| 2016/0288254 | A1 | 10/2016 | Pettit et al. | |
| 2017/0239724 | A1 | 8/2017 | Diaz et al. | |

FOREIGN PATENT DOCUMENTS

| | | | |
|---|---|---|---|
| CN | 107109513 | A | 8/2017 |
| CN | 107922989 | A | 4/2018 |
| CN | 107980067 | A | 5/2018 |
| CN | 109843498 | A | 6/2019 |
| WO | 2014037281 | A2 | 3/2014 |
| WO | 2015135715 | A1 | 9/2015 |
| WO | 2016026706 | A1 | 2/2016 |
| WO | 2016146646 | A1 | 9/2016 |
| WO | 2018054850 | A1 | 3/2018 |

OTHER PUBLICATIONS

Written Opinion issued Aug. 4, 2020 re: Application No. PCT/EP2020/064891 pp. 1-7, citing: US 2017/0239724 A1.

Chinese Office Action for Application No. 202080046377.4, dated Apr. 1, 2024, 16 pages with translation.

* cited by examiner

METHOD AND SYSTEM FOR HEATING USING AN ENERGY BEAM

TECHNICAL FIELD

The present disclosure relates to the heating of an object using an energy beam, such as a laser beam.

BACKGROUND

It is known in the art to heat objects by directing an energy beam, such as a light beam, for example, a laser beam, onto the object. For example, it is well known in the art to harden ferrous materials, such as steel (for example, medium carbon steel), by heating the material to a high temperature, below its melting temperature, and subsequently quenching it, that is, cooling it rapidly enough to form hard martensite. Heating can take place in furnaces or by induction heating, and cooling can take place by applying a cooling fluid, such as water or water mixed with other components. It is also known to use an energy beam such as a light beam for carrying out certain hardening process, for example, in relation to complex products such as crankshafts. Crankshafts have complex surfaces and very high requirements on the resistance to wear during use. For example, WO-2014/037281-A2 explains how a laser beam can be used for, for example, the hardening of the surfaces of journals of a crankshaft, without producing overheating of the areas adjacent to the oil lubrication holes. Also other objects can be heat treated by methods and systems in line with the ones taught by WO-2014/037281-A2, the contents of which are incorporated herein by reference. WO-2014/037281-A1 discusses, inter alia, how a workpiece can be selectively heated by projecting a beam onto a surface of the workpiece so as to produce a primary spot on the surface, the beam being repetitively scanned in two dimensions in accordance with a scanning pattern so as to establish an effective spot on the surface of the workpiece, this effective spot having a two-dimensional energy distribution. This effective spot is displaced in relation to the surface of the workpiece to progressively heat a selected portion of the workpiece. In some embodiments, the two-dimensional energy distribution of the effective spot is dynamically adapted during displacement of the effective spot in relation to the surface of the workpiece.

WO-2015/135715-A1, the contents of which are incorporated herein by reference, discusses inter alia how, in the context of this kind of technique for laser hardening, different scanning patterns can be used. Illustrated embodiments include scanning patterns with segments that are perpendicular to each other. One illustrated embodiment features a scanning pattern substantially shaped as a "digital 8".

It has been found that the technique for heating using an energy beam as suggested in WO-2014/037281-A1 and WO-2015/135715-A1 can be used for other applications than for hardening of workpieces. For example, WO-2016/026706-A1, the contents of which are incorporated herein by reference, teaches how the technique can be used for additive manufacturing. WO-2016/146646-A1, the contents of which are incorporated by reference, teaches how the technique can be used for heat treatment of sheet metal. Further applications include welding of objects, for example, for joining two or more components of an object, as described in WO-2018/054850-A1, the contents of which are incorporated herein by reference.

The techniques described in the above recited patent applications have been found to involve substantial advantages in terms of flexibility, adaptability, product quality and productivity.

Determining suitable scanning patterns and parameters associated therewith such as scanning speed (that is, the velocity with which the spot projected by the laser beam moves along the scanning pattern and along the different portions or segments thereof), laser beam power, laser spot size, and the velocity of the effective spot along the track or path that it follows on the surface of the object being treated can involve the use of empiric testing (such as trial-and-error tests), simulations, calculations, or a combination thereof.

It is often desirable that certain product features remain constant along the track that is heat treated by the effective spot. For example, in the case of laser hardening as discussed in WO-2014/037281-A2, a constant hardening depth along the track is often desired. Similar considerations apply to many other applications, such as laser softening, laser welding, etc.

In many applications, such as laser hardening of journals of crankshafts and many other applications, the effective spot maintains a substantially constant width while moving along its track, in order to provide a heat treated portion of the workpiece having a substantially constant width all throughout its extension, from its beginning to its end, for example, all along the circumference of a journal of a crankshaft, just to give an example. Another example, in the context of heat treatment of sheet metal components as disclosed in WO-2016/146646-A1, can be laser softening of a portion of a vehicle pillar to create a softened band of constant width in the vehicle pillar, for example, to create an area where deformation will prevalently take place in the case of a collision, or where the vehicle pillar can be cut through more easily.

SUMMARY

However, sometimes it may be desired to provide heat treatment to a portion or strip having a width that varies substantially along the track to be followed by the effective spot, for example, to provide a more or less sophisticated pattern of hardened or softened material, a weld seam, consolidated matter such as fused powder in the context of additive manufacturing, etc.

In such contexts, it is often preferred that the basic characteristics of the heat treatment remain substantially constant along the track except for the above-mentioned change in the width of the heated portion or strip along the track. For example, in the case of laser hardening, it is often desired that the hardened depth remain constant along the track.

Calculating the energy that is necessary for achieving a certain hardening depth may include determining the volume to be heated, the amount with which the temperature is to be raised, the specific heat capacity of the material, etc. Thus, for example, for hardening a portion having a certain width to a certain depth, the necessary radiation energy per unit of length of the track can be determined, thereby providing a basis for determining the velocity with which the effective spot produced by a beam with a certain power is to be displaced along the track. Additional aspects to consider include the energy distribution within the effective spot, for example, whether to opt for a leading portion having a higher energy density than a trailing portion, just to give an example. Thus, one approach can be based on establishing an energy flow (in terms of $J/m^2$), for example, for a leading and trailing part of the scanning pattern, and thereafter determining the appropriate velocity of the effective spot and the power of the laser beam. The chosen scanning pattern, beam power, velocity of the primary spot along different portions of the scanning pattern (such as along a leading segment and a trailing segment), and velocity of the effective spot along the track can be verified by simulations and/or trial and error tests, until a suitable combination of parameters has been determined.

When the portion to be heated has a width that varies along the track, for example, by featuring one or more segments having a width that is reduced or increased in relation to a reference width, one way of ensuring substantially constant performance (in terms of, for example, hardening depth, softening, weld seam depth, etc.) resides in operating so that the energy flow (in terms of $J/m^2$) remains substantially constant at the different segments or sub-portions along the track, while the width of the scanning pattern is adapted to correspond to the width of the respective sub-portion subjected to heat treatment at each specific moment. For example, a change in the width of the portion to be heated by more than X % may require a corresponding reduction in the width of the effective spot, and thereby a corresponding change in the scanning pattern, including a change of the width of the scanning pattern, taking into account the width or diameter of the primary laser spot, that is, of the laser spot that at each specific point is projected onto the surface or surfaces being treated.

A first aspect of the disclosure relates to a method of heating at least one selected portion of an object, comprising the steps of

- projecting an energy beam onto a surface of the object so as to produce a primary spot on the surface, and repetitively scanning the beam in two dimensions in accordance with a scanning pattern so as to establish an effective spot (which can also be called a virtual spot, created by the two-dimensional scanning of the primary spot) on the surface, the effective spot having a two-dimensional energy distribution, and
- displacing the effective spot along a track on the surface of the object to progressively heat a selected portion of the object;
- wherein the selected portion has a first width at a first position along the track (such as along a first sub-portion thereof), and a second width at a second position along the track (such as along a second sub-portion thereof). That is, the selected portion, such as a band or strip to be heated, basically has a width that varies along the track, the width being the dimension of the selected portion perpendicular to the track or line followed by the effective spot. In some embodiments, the first width is substantially constant throughout a first sub-portion of the object, and the second width is substantially constant throughout a second sub-portion of the object, whereby the first and second positions correspond to positions within the respective sub-portions.

The beam is scanned in accordance with the scanning pattern so that the scanning pattern is repeated by the beam with a first frequency in correspondence with the first position along the track (such as along a first sub-portion having said first width), and with a second frequency in correspondence with the second position along the track (such as along a second sub-portion having said second width). Both of said first frequency and said second frequency are larger than 10 Hz, and the second width is less than 75% of the first width. The second frequency is more than 60% of the first frequency and less than 140% of the first frequency.

As explained above, to accommodate changes in width of the portion to be heated, the effective spot is to be adapted, at least by reducing its extension in the direction perpendicular to the track followed by the effective spot, that is, in the width direction. This typically involves adapting the scanning pattern, for example, by reducing or increasing its maximum extension in the width direction, that is, the direction perpendicular to the track. However, adapting the scanning pattern accordingly typically affects the repetition rate of the scanning pattern: for a given scanning speed, a smaller or shorter scanning pattern can typically be repeated with a higher frequency than a larger or longer scanning pattern.

However, it has surprisingly been observed that keeping the repetition rate of the scanning pattern substantially constant, such as deviating by less than 40% from the reference frequency (that is, so that the frequency at the portion with narrower width deviates by less than 40% from the frequency at the portion with larger width, and vice-versa) can be helpful in order to allow for a substantial maintenance of the performance, for example, in terms of hardening depth, prevention of overheating of the surface, etc. The reasons for this are not fully clear, but it is believed that it may have to do with the fact that a substantially constant repetition rate may have an influence on issues such as the temperature fluctuations within the area being heated by the effective spot, and/or on the deformation of the theoretical scanning pattern when the two-dimensional repetitive movement by which the primary spot follows the scanning pattern is overlaid on the movement of the effective spot along the track. Additionally or alternatively, it appears that a very high repetition rate of the scanning pattern may be sub-optimal in that it could imply an excessively aggressive application of heat, by increasing the number of times or the frequency with which a given subarea is receiving the laser beam. It appears that this may affect the depth of the heat treatment, and/or give rise to overheating of the surface layer. For example, in the case of laser hardening, it has been observed that a substantial increase in the frequency with which the scanning pattern is repeated can give rise to melting of the surface layer and even to waves therein, thus negatively affecting the quality of the product.

Thus, and contrary to the prima facie most attractive approach involving increasing the repetition rate of the scanning pattern when the width of the effective spot is reduced (thereby making maximum use of the capacity of the scanner so as to reduce the temperature fluctuations within the area being heated, as explained in for example WO-2014/037281-A2), by keeping the repetition rate substantially constant (such as by deviating by less than 40%, 30%, 25%, 20%, 15%, 10%, 5% or 1% from a given repetition rate, such as the one set for a wider or narrower sub-portion), homogeneity of the heat treatment can be enhanced along the track, in spite of substantial variations in the width of the portion subjected to heat treatment.

The expressions “first position” and “second position” are used merely to distinguish between these two positions along the track, and do intend to denote any specific order of these two positions along the track. That is, the first position may be reached earlier or later than the second position when the effective spot travels along the track.

In some embodiments of the disclosure, the second width is less than 60% of said first width, such as less than 50% of said first width. Thus, substantial changes in width of the portion being heated in one sweep of the effective spot along the track can be readily accommodated while maintaining desired characteristics of the resulting product in terms of, for example, parameters such as hardening depth, by keeping the repetition rate of the scanning pattern substantially constant, in spite of the natural tendency to operate the scanner at the highest possible scanning speed, or close thereto.

In some embodiments of the disclosure, the second frequency is more than 70% of said first frequency, such as more than 75%, 80%, 85% or 90% of said first frequency. In some embodiments of the disclosure, the second frequency is less than 130% of said first frequency, such as less than 125%, 120%, 115% or 110% of said first frequency.

That is, as explained above, it is preferred that the second frequency be substantially equal to the first frequency, for example, not varying from the first frequency by more than 40%, 30%, 25%, 20%, 15%, 10%, 5% or 1%, in spite of substantial variations of the width, for example, the second width being less than 75%, 60%, 50%, 40% or 30% of the first width. For example, in such cases, the second frequency may be between 60% and 140% of the first frequency, such as between 70% and 130% of the first frequency, including between 80% and 120% of the first frequency, between 85% and 115% of the first frequency, between 90% and 110% and between 95% and 105% of the first frequency.

In some embodiments of the disclosure, the average velocity of the primary spot along the scanning pattern (in terms of length of the scanning pattern divided by the time needed for the primary spot to complete the scanning pattern) is substantially higher when the effective spot is at the first position along the track than when the effective spot is at the second position along the track. In some of these embodiments, the average velocity of the primary spot along the scanning pattern is at least 10% higher when the effective spot is at the first position along the track than when the effective spot is at the second position along the track. In some of these embodiments, the average velocity of the primary spot along the scanning pattern is at least 20% higher, such as at least 30% higher, 50% higher, or 100% higher, when the effective spot is at the first position along the track than when the effective spot is at the second position along the track. In some embodiments, the average velocity is X % higher when the effective spot is at the first position along the track than when the effective spot is at the second position along the track, X being at least 10, such as at least 20, 30, 40, 50, 75, 100, 200 or more. A substantially higher average velocity at the first position than at the second position can serve to keep the repetition rate (frequency of repetition) of the scanning pattern substantially the same at the first position and at the second position, in spite of the fact that the scanning pattern may be substantially longer at the first position, due to the larger width of the effective spot, needed to cover the larger width of the portion to be heated at the first position.

In some embodiments of the disclosure, the effective spot features a first radiation energy flow (in terms of $J/m^2$) onto the surface of the object in correspondence with the first position along the track, and a second radiation energy flow (in terms of $J/m^2$) onto the surface of the object in correspondence with the second position along the track, the second radiation energy flow being not more than 110% of said first radiation energy flow, and not less than 90% of said first radiation energy flow.

The radiation energy flow refers to how much energy is applied per unit of surface area being treated, by the effective spot when swept along the track. It has been found that for homogeneous heat treatment (for example, in terms of hardening depth and/or other quality parameters), a homogenous radiation energy flow may be preferred. It is preferred that not only the radiation energy flow as such remains substantially constant, such as deviating by less than 10% at the second position compared to said first position, but that also the distribution of the radiation energy flow along and across the effective spot be kept substantially constant. For example, if a leading portion of the effective spot represents Y % of the total radiation energy flow of the effective spot at the first position, it is preferred that the leading portion represent approximately Y % of the total radiation energy flow of the effective spot also at the second position along the track, such as more than 0.9*Y % and less than 1.1*Y %. This has been found to contribute to substantially uniform performance in terms of the quality of the heat treatment (for example, in the case of laser hardening, in terms of hardening depth, etc.).

In some embodiments of the disclosure, both of said first frequency and said second frequency are larger than 25 Hz, such as larger than 80 Hz, such as larger than 80 Hz and smaller than 150 Hz, such as larger than 80 Hz and smaller than 120 Hz. For example, for many surface hardening applications frequencies larger than 80 Hz and smaller than 120 Hz have been found to provide good results.

In some embodiments of the disclosure, adaptation of the two-dimensional energy distribution of the effective spot includes adapting the two-dimensional energy distribution by modifying (that is, increasing or reducing) the width of the effective spot by adapting the scanning pattern, and adapting the average velocity with which the primary spot moves along the scanning pattern.

In some embodiments of the disclosure, the energy beam has a first average power in correspondence with the first position along the track (such as along a first sub-portion having first width), and a second average power in correspondence with the second position along the track (such as along a second sub-portion having said second width), the second average power being at least 10% smaller than the first average power (such as at least 20%, 30%, 40% or 50% smaller than the first average power). The term "average power" refers to the amount of energy applied by the laser beam during one cycle of the scanning pattern, divided by the duration of the cycle. Whereas from a perspective of maximization of efficient use of laser power it is often preferable to operate the laser substantially at its maximum power output during all of, or a substantial part of, the scanning, it has been found that this may not be appropriate or that it may be sub-optimal for many applications. For example, if the radiation energy flow in terms of $J/m^2$ is to be kept constant, a reduced width of the scanning pattern in correspondence with a narrower sub-portion of the portion subjected to heat treatment while keeping the laser power constant could for example be compensated by increasing the velocity with which the effective spot is displaced along the track. However, such an increase in velocity could have a substantial impact on the quality parameters of the heat treatment, for example, in the case of laser surface hardening, in terms of the hardening depth. For example, in the case of a decrease by 50% in the width of the portion being hardened, keeping the beam power as well as the radiation energy flow constant could require doubling the velocity with which the effective spot is displaced along the track, which may be suboptimal. For example, in the case of laser hardening, the hardening depth might turn out to be insufficient, and/or overheating of the surface might occur. Thus, reducing the average beam power could be a better option, even though it may imply a sub-optimal use of the available laser power offered by the equipment.

In some embodiments of the disclosure, the effective spot (12A, 12B) is displaced along the track with a first velocity in correspondence with the first position along the track, and with a second velocity in correspondence with the second position along the track, the second velocity being different from the first velocity. For example, the second velocity may differ from the first velocity by at least 10%, 20%, 30% or more. Changing the velocity with which the effective spot moves (that is, the so-called process velocity) can contribute to reducing the need to modify the beam power when transiting from a sub-portion having one width to a sub-portion having another width, while maintaining the radiation energy flow substantially constant. For example, the velocity may be higher in correspondence with a narrower sub-portion to be heated than in correspondence with a wider sub-portion to be heated, so as to at least partly compensate for the decrease in width of the effective spot, maintaining the radiation energy flow and the average beam power substantially constant. As an alternative, the velocity may be lower in correspondence with the narrower sub-portion, thereby compensating for the use of a lower average beam power as discussed above, allowing the radiation energy flow in terms of $J/m^2$ to be maintained substantially constant.

In some embodiments of the disclosure, the effective spot has a length in the direction parallel with the track that is smaller in correspondence with the first position than in correspondence with the second position, for example, at least 10%, 20%, 30%, 40% or 50% smaller. Making the effective spot longer in correspondence with a narrower sub-portion to be heat treated than in correspondence with a wider sub-portion can contribute to maintaining the radiation energy flow substantially constant while increasing the velocity of the effective spot along the track, while at the same time maintaining each given portion along the track subjected to heat treatment for a sufficient amount of time, for example, to achieve a desired hardening or softening or melting depth. That is, basically, a higher velocity along the track to prevent overheating while keeping the beam power relatively high can be compensated by making the effective spot longer in the direction parallel with the track.

A further aspect of the disclosure relates to a method of heating at least one selected portion of an object, comprising the steps of

- projecting an energy beam onto a surface of the object so as to produce a primary spot on the surface, and repetitively scanning the beam in two dimensions in accordance with a scanning pattern so as to establish an effective (virtual) spot on the surface, the effective spot having a two-dimensional energy distribution, and
- displacing the effective spot along a track on the surface of the object to progressively heat a selected portion of the object;
- wherein the selected portion has a first width at a first position along the track, and a second width at a second position along the track. That is, the selected portion, such as a band or strip to be heated, basically has a width that varies along the track, the width being the dimension of the selected portion perpendicular to the track or line followed by the effective spot. In some embodiments, the first width is substantially constant throughout a first sub-portion of the object, and the second width is substantially constant throughout a second sub-portion of the object, whereby the first and second positions correspond to positions within the respective sub-portions. In some embodiments the second width is less than 90%, 80%, 70%, 60%, 50% or 40% of the first width. The first position may be positioned before or after the second position in the direction along the track followed by the effective spot.

The beam is scanned in accordance with the scanning pattern so that the scanning pattern is repeated by the beam with a first frequency in correspondence with the first position along the track (such as along a first sub-portion having said first width), and with a second frequency in correspondence with the second position along the track (such as along a second sub-portion having said second width). Both of said first frequency and said second frequency are larger than 10 Hz (such as larger than 50, 80 or 100 Hz). The first and second frequencies may be substantially identical or different; in some embodiments it is preferred that they be substantially identical, for example, that the second frequency not differs from the first frequency by more than 40%, 30%, 25%, 20%, 15%, 10%, 5% or 1%.

The energy beam has a first average power in correspondence with the first position along the track (such as along a first sub-portion having the first width), and a second average power in correspondence with the second position along the track (such as along a second sub-portion having the second width), the second average power being smaller than the first average power (such as at least 10%, 20%, 30%, 40%, or 50% smaller than the first average power). The term "average power" refers to the amount of energy applied by the laser beam during one cycle of the scanning pattern, divided by the duration of the cycle. Whereas from a perspective of maximization of efficient use of laser power it is often preferable to operate the laser substantially at its maximum power output during all of, or a substantial part of, the scanning, it has been found that this may not be appropriate or that it may be sub-optimal for many applications. For example, if the radiation energy flow in terms of $J/m^2$ is to be kept constant, a reduced width of the scanning pattern in correspondence with a narrower sub-portion of the portion subjected to heat treatment while keeping the laser power constant could for example be compensated by increasing the velocity with which the effective spot is displaced along the track. However, such an increase in velocity could have a substantial impact on the quality parameters of the heat treatment, for example, in the case of laser surface hardening, in terms of the hardening depth. For example, in the case of a decrease by 50% in the width of the portion being hardened, keeping the beam power as well as the radiation energy flow constant could require doubling the velocity with which the effective spot is displaced along the track, which may be suboptimal. For example, in the case of laser hardening, the hardening depth might turn out to be insufficient, and/or overheating of the surface might occur. Thus, reducing the average beam power could be a better option, even though it may imply a sub-optimal use of the available laser power.

A further aspect of the disclosure relates to a method of heating at least one selected portion of an object, comprising the steps of

- projecting an energy beam onto a surface of the object so as to produce a primary spot on the surface, and repetitively scanning the beam in two dimensions in accordance with a scanning pattern so as to establish an effective (virtual) spot on the surface, the effective spot having a two-dimensional energy distribution, and displacing the effective spot along a track on the surface of the object to progressively heat a selected portion of the object;

wherein the selected portion has a first width at a first position along the track, and a second width at a second position along the track. That is, the selected portion, such as a band or strip to be heated, basically has a width that varies along the track, the width being the dimension of the selected portion perpendicular to the track or line followed by the effective spot. In some embodiments, the first width is substantially constant throughout a first sub-portion of the object, and the second width is substantially constant throughout a second sub-portion of the object, whereby the first and second positions correspond to positions within the respective sub-portions. In some embodiments the second width is less than 90%, 80%, 70%, 60%, 50% or 40% of the first width. The first position may be positioned before or after the second position in the direction along the track followed by the effective spot.

The beam is scanned in accordance with the scanning pattern so that the scanning pattern is repeated by the beam with a first frequency in correspondence with the first position along the track (such as along a first sub-portion having said first width), and with a second frequency in correspondence with the second position along the track (such as along a second sub-portion having said second width), and wherein both of said first frequency and said second frequency are larger than 10 Hz (such as larger than 50, 80 or 100 Hz). The first and second frequencies may be substantially identical or different; in some embodiments it is preferred that they be substantially identical, for example, that the second frequency not differs from the first frequency by more than 40%, 30%, 25%, 20%, 15%, 10%, 5% or 1%.

The effective spot is displaced along the track with a first velocity in correspondence with the first position along the track, and with a second velocity in correspondence with the second position along the track, the second velocity being different from the first velocity. For example, the second velocity may differ from the first velocity by at least 10%, 20%, 30% or more, for example, the second velocity may be at least 10%, 20% or 30% higher or lower than the first velocity. Changing the velocity can contribute to reducing the need to modify the beam power when transiting from a sub-portion having one width to a sub-portion having another width, while maintaining the radiation energy flow substantially constant. For example, the velocity may be higher in correspondence with a narrower sub-portion to be heated than in correspondence with a wider sub-portion to be heated, so as to at least partly compensate for the decrease in width of the effective spot, maintaining the radiation energy flow and optionally the average beam power substantially constant. As an alternative, the velocity may be lower in correspondence with the narrower sub-portion, thereby compensating for the use of a lower average beam power as discussed above, allowing the radiation energy flow in terms of $J/m^2$ to be maintained substantially constant.

A further aspect of the disclosure relates to a method of heating at least one selected portion of an object, comprising the steps of projecting an energy beam onto a surface of the object so as to produce a primary spot on the surface, and repetitively scanning the beam in two dimensions in accordance with a scanning pattern so as to establish an effective (virtual) spot on the surface, the effective spot having a two-dimensional energy distribution, and displacing the effective spot along a track on the surface of the object to progressively heat a selected portion of the object;

wherein the selected portion has a first width at a first position along the track, and a second width at a second position along the track. That is, the selected portion, such as a band or strip to be heated, basically has a width that varies along the track, the width being the dimension of the selected portion perpendicular to the track or line followed by the effective spot. In some embodiments, the first width is substantially constant throughout a first sub-portion of the object, and the second width is substantially constant throughout a second sub-portion of the object, whereby the first and second positions correspond to positions within the respective sub-portions. In some embodiments the second width is less than 90%, 80%, 70%, 60%, 50% or 40% of the first width. The first position may be positioned before or after the second position in the direction along the track followed by the effective spot.

The beam is scanned in accordance with the scanning pattern so that the scanning pattern is repeated by the beam with a first frequency in correspondence with the first position along the track (such as along a first sub-portion having said first width), and with a second frequency in correspondence with the second position along the track (such as along a second sub-portion having said second width). Both of said first frequency and said second frequency are larger than 10 Hz, such as larger than 50, 80 or 100 Hz. The first and second frequencies may be substantially identical or different; in some embodiments it is preferred that they be substantially identical, for example, that the second frequency not differs from the first frequency by more than 40%, 30%, 25%, 20%, 15%, 10%, 5% or 1%.

The effective spot has a length in the direction parallel with the track that is smaller in correspondence with the first position than in correspondence with the second position, for example, at least 10%, 20%, 30%, 40% or 50% smaller. Making the effective spot longer in correspondence with a narrower sub-portion to be heat treated than in correspondence with a wider sub-portion can contribute to maintaining the radiation energy flow substantially constant while increasing the velocity of the effective spot along the track, while at the same time maintaining each given portion along the track subjected to heat treatment for sufficient amount of time, for example, to achieve a desired hardening or softening or melting depth. That is, basically, a higher velocity along the track to prevent overheating while keeping the beam power relatively high can be compensated by making the effective spot longer in the direction parallel with the track.

The different aspects can be combined, for example, by varying the average beam power and the velocity of the effective spot along the track, or by varying the average beam power and the length of the effective spot, or by varying the velocity of the effective spot along the track and the length of the effective spot, or by varying all of these three parameters, while optionally maintaining the repetition rate of the scanning pattern substantially constant.

In some embodiments of the disclosure, the effective spot features a first radiation energy flow (in terms of $J/m^2$) onto the surface of the object in correspondence with the first position along the track, and a second radiation energy flow (in terms of $J/m^2$) onto the surface of the object in correspondence with the second position along the track, the second radiation energy flow being not more than 140% of said first radiation energy flow, and not less than 60% of said first radiation energy flow, such as not more than 130% of said first radiation energy flow and not less than 70% of said first radiation energy flow, such as not more than 120% of said first radiation energy flow and not less than 80% of said first radiation energy flow, such as not more than 110% of said first radiation energy flow and not less than 90% of said first radiation energy flow, such as not more than 105% of said first radiation energy flow and not less than 95% of said first radiation energy flow. The radiation energy flow refers to how much energy is applied per unit of surface area being treated, by the effective spot when swept along the track. It has been found that for homogeneous heat treatment (for example, in terms of hardening depth and/or other quality parameters), a homogenous radiation energy flow may be preferred. It is preferred that not only the radiation energy flow as such remain substantially constant, such as deviating by less than 40%, 30%, 20%, 10% or 5% at the second position compared to said first position, but that also the distribution of the radiation energy flow along and across the effective spot be kept substantially constant. For example, if a leading portion of the effective spot represents Y % of the total radiation energy flow of the effective spot at the first position, it is preferred that the leading portion represent approximately Y % of the total radiation energy flow of the effective spot at the second position along the track, such as more than 0.9*Y % and less than 1.1*Y %. This has been found to contribute to substantially uniform performance in terms of the quality of the heat treatment (for example, in the case of laser hardening, in terms of hardening depth, etc.). By appropriately setting parameters such as average beam power, velocity of the effective spot along the track and the length of the effective spot in the direction parallel with the track, it is possible to maintain the radiation energy flow substantially constant while also complying with other process requirements, such as for example, adequate surface heating for example, avoiding re-melting or overheating-, appropriate depth of the treatment such as appropriate hardening depth-, etc.

In some embodiments of the disclosure, the first scanning pattern represents a third radiation energy flow defined as the energy supplied by the beam during one sweep along the first scanning pattern divided by the surface area swept by the primary spot during that one sweep along the first scanning pattern, and wherein the second scanning pattern (11B) represents a fourth radiation energy flow defined as the energy supplied by the beam during one sweep along the second scanning pattern divided by the surface area swept by the primary spot during that one sweep along the second scanning pattern, wherein the third radiation energy flow is substantially identical to the fourth radiation energy flow. In this context, "substantially identical" means that the fourth radiation energy flow does not differ from the third radiation energy flow by more than 40%, preferably not by more than 30%, 25%, 20%, 15%, 10%, 5%, 2% or 1%. It has been found that maintaining the radiation energy flow corresponding to the scanning pattern substantially constant, quality parameters can be maintained, for example, in what regards hardening depth, etc. Thus, two kinds of radiation energy flows can be kept substantially constant: the one corresponding to the radiation energy per unit of surface area applied to each of the different sub-portions due to the movement of the effective spot along the respective sub-portion, and the one corresponding to the scanning pattern, that is, the one defined by the energy applied by the primary spot when swept once along the scanning pattern, divided by the area actually swept by the primary spot when moving once along the scanning pattern. In the case of a complex pattern/energy distribution, such as one with a higher energy density in correspondence with a leading portion than in correspondence with a trailing portion, the identity between the radiation energy flows corresponding to the scanning pattern should preferably also exist between different portions of the scanning patterns, for example, the radiation energy flow corresponding to the leading portion of the first scanning pattern shall preferably by substantially identical to the radiation energy flow corresponding to the leading portion of the second scanning pattern, and the radiation energy flow corresponding to the trailing portion of the first scanning pattern shall preferably by substantially identical to the radiation energy flow corresponding to the trailing portion of the second scanning pattern. It has been found that keeping the radiation energy flows substantially constant in spite of changes in the width of the portion being heated (and in spite of the corresponding changes in the width of the scanning pattern and the effective spot), not only in what regards the radiation energy flow in terms of $J/m^2$ applied to the respective sub-portions of the track, but also in what regards the radiation energy flow corresponding to the scanning pattern as such (that is, the radiation energy flow corresponding to one sweep of the primary spot along the scanning pattern) and to the individual portions thereof (especially when the energy flow is not constant along the scanning pattern, for example, due to different scanning velocities and/or different beam power levels in correspondence with different portions of the scanning pattern), helps to maintain the performance of the process substantially constant along the entire portion being heated (for example, in the case of laser hardening, the hardening depth and quality can be maintained substantially constant along the entire portion subjected to heat treatment). It has additionally been found that a further parameter that contributes to (and in some cases may be necessary for) maintaining the performance of the process substantially constant along the track is a substantially constant scanning frequency, such as a scanning frequency not deviating by more than 20%, 10% or 5% from an average or reference scanning frequency.

A further aspect of the disclosure relates to a method of heating at least one selected portion of an object, comprising the steps of projecting an energy beam onto a surface of the object so as to produce a primary spot on the surface, and repetitively scanning the beam in two dimensions in accordance with a scanning pattern so as to establish an effective (virtual) spot on the surface, the effective spot having a two-dimensional energy distribution, and displacing the effective spot along a track on the surface of the object to progressively heat a selected portion of the object;

wherein the selected portion has a first width throughout a first sub-portion and a second width throughout a second sub-portion of the selected portion; that is, the width remains substantially constant throughout the respective sub-portion, such as deviating by less than 20%, 15%, 10%, 5% or 1% from an average width. The first width is larger than the second width (W2). In some embodiments the (average) second width is less than 90%, 80%, 70%, 60%, 50% or 40% of the (average) first width. The first sub-portion may be positioned before or after the second sub-portion in the direction along the track followed by the effective spot.

The beam is scanned in accordance with a first scanning pattern in the first sub-portion and in accordance with the second scanning pattern in the second sub-portion, wherein the first scanning pattern is repeated by the beam with a first frequency and wherein the second scanning pattern is repeated by the beam with a second frequency, and wherein both of said first frequency and said second frequency are larger than 10 Hz, such as larger than 50, 80 or 100 Hz. The first and second frequencies may be substantially identical or different; in some embodiments it is preferred that they be substantially identical, for example, that the second frequency not differs from the first frequency by more than 40%, 30%, 25%, 20%, 15%, 10%, 5% or 1%.

The first sub-portion is subjected to a first radiation energy flow (in terms of $J/m^2$) and the second sub-portion is subjected to a second radiation energy flow (in terms of $J/m^2$). The first scanning pattern represents a third radiation energy flow defined as the energy supplied by the beam during one sweep along first the scanning pattern divided by the surface area swept by the primary spot, and the second scanning pattern represents a fourth radiation energy flow defined as the energy supplied by the beam during one sweep along the second scanning pattern divided by the surface area swept by the primary spot. The first radiation energy flow is substantially identical to the second radiation energy flow, and the third radiation energy flow is substantially identical to the fourth radiation energy flow.

In this context, "substantially identical" means that the second radiation energy flow does not differ from the first radiation energy flow by more than 40%, preferably not by more than 30%, 25%, 20%, 15%, 10%, 5%, 2% or 1%, and that the fourth radiation energy flow does not differ from the third radiation energy flow by more than 40%, preferably not by more than 30%, 25%, 20%, 15%, 10%, 5%, 2% or 1%.

It has been found that maintaining the radiation energy flow corresponding to the scanning pattern substantially constant, quality parameters can be maintained, for example, in what regards hardening depth, etc. Thus, two kinds of radiation energy flows can be kept substantially constant: the one corresponding to the radiation energy per unit of surface area applied to each of the different sub-portions due to the movement of the effective spot along the respective sub-portion, and the one corresponding to the scanning pattern, that is, the one defined by the energy applied by the primary spot when swept once along the scanning pattern, divided by the area actually swept by the primary spot when moving once along the scanning pattern. In the case of a complex pattern/energy distribution, such as one with a higher energy density in correspondence with a leading portion than in correspondence with a trailing portion, the identity between the radiation energy flows corresponding to the scanning pattern should preferably also exist between different portions of the scanning patterns, for example, the radiation energy flow corresponding to the leading portion of the first scanning pattern shall preferably by substantially identical to the radiation energy flow corresponding to the leading portion of the second scanning pattern, and the radiation energy flow corresponding to the trailing portion of the first scanning pattern shall preferably by substantially identical to the radiation energy flow corresponding to the trailing portion of the second scanning pattern. It has been found that keeping the radiation energy flows substantially constant in spite of changes in the width of the portion being heated (and in spite of the corresponding changes in the width of the scanning pattern and the effective spot), not only in what regards the radiation energy flow in terms of $J/m^2$ applied to the respective sub-portions of the track, but also in what regards the radiation energy flow corresponding to the scanning pattern as such (that is, the radiation energy flow corresponding to one sweep of the primary spot along the scanning pattern) and to the individual portions thereof (especially when the energy flow is not constant along the scanning pattern, for example, due to different scanning velocities and/or different beam power levels in correspondence with different portions of the scanning pattern), helps to maintain the performance of the process substantially constant along the entire portion being heated (for example, in the case of laser hardening, the hardening depth and quality can be maintained substantially constant along the entire portion subjected to heat treatment). It has additionally been found that a further parameter that contributes to (and in some cases may be necessary for) maintaining the performance of the process substantially constant along the track is a substantially constant scanning frequency, such as a scanning frequency not deviating by more than 20%, 10% or 5% from an average or reference scanning frequency.

In some embodiments of the disclosure, the energy beam has a first average power in correspondence with the first sub-portion and a second average power in correspondence with the second sub-portion, the second average power being smaller than the first average power, such as at least 10%, 20%, 30%, 40%, 50% smaller than the first average power. The term "average power" refers to the amount of energy applied by the laser beam during one cycle of the scanning pattern, divided by the duration of the cycle. Whereas from a perspective of maximization of efficient use of laser power it is often preferable to operate the laser substantially at its maximum power output during all of, or a substantial part of, the scanning, it has proven that this may not be appropriate or that it at least may be sub-optimal for many applications. For example, if the radiation energy flow in terms of $J/m^2$ is to be kept constant, a reduced width of the scanning pattern in correspondence with a narrower sub-portion of the portion subjected to heat treatment while keeping the laser power constant could for example be compensated by increasing the velocity with which the effective spot is displaced along the track. However, such an increase in velocity could have a substantial impact on the quality parameters of the heat treatment, for example, in the case of laser surface hardening, in terms of the hardening depth. For example, in the case of a decrease by 50% in the width of the portion being hardened, keeping the beam power as well as the radiation energy flow constant could require doubling the velocity with which the effective spot is displaced along the track.

What has been indicated in relation to the first aspect of the disclosure also applies to the further aspects of the disclosure, mutatis mutandis.

In some embodiments of the disclosure, the second width is less than 90% of the first width, such as less than 80%, 70%, 60%, 50% etc. of the first width. Substantial changes in width may be compensated by adapting process parameters such as average beam power along the scanning pattern, velocity of the effective spot along the track, the extension of the effective spot in the direction parallel with the track, etc., optionally while maintaining the repetition rate or frequency of the scanning pattern substantially constant, such as within a range of +/−40%, 30%, 25%, 20%, 15%, 10% or less from a reference frequency.

In some embodiments of the disclosure, the second frequency is more than 60% of the first frequency and less than 140% of the first frequency, such as more than 70% of the first frequency and less than 130% of the first frequency such as more than 75% of the first frequency and less than 125% of the first frequency such as more than 80% of the first frequency and less than 120% of the first frequency, such as more than 85% of the first frequency and less than 115% of the first frequency such as more than 90% of the first frequency and less than 110% of the first frequency, such as more than 95% of the first frequency and less than 105% of the first frequency. As explained above, it is often preferred to keep the frequency constant in spite of variations in the width of the portion to be heated along the track.

In some embodiments of the disclosure, the energy beam is a laser beam. A laser beam is often preferred due to issues such as cost, reliability, and availability of appropriate scanning systems. In some embodiments of the disclosure, the power of the laser beam is higher than 1 kW, such as higher than 3 kW, higher than 4 kW, higher than 5 kW or higher than 6 kW, at least during part of the process.

A further aspect of the disclosure relates to a system for heating at least one selected portion of an object, the system comprising means for producing an energy beam and for projecting the energy beam onto a surface of the object, and a scanner for scanning the energy beam in at least two dimensions.

The system is programmed for carrying out one or more of the method described above.

It is considered that the teachings of the present document and/or at least some of the advantages involved therewith are especially applicable to cases in which the thickness of the object subjected to heat treatment is substantially larger, such as at least 2, 3, 5, 10, 20, 30, 40 or 50 times larger, than the depth of the heat treatment (for example, the hardening depth in the case of laser beam hardening), along the track or at least along a part thereof.

In the present context, references to the scanning pattern and its shape refer to the two-dimensional scanning pattern followed by the primary spot when projected onto a flat surface (for example, in the x-y-plane) substantially perpendicular to the light beam, rather than to the pattern actually followed by the primary spot on the surface of the object; for example, the surface may include sharp curvatures or bends that will obviously affect the track actually followed by the primary spot in three dimensions. That is, the "scanning pattern" refers to the pattern followed by the beam rather than the pattern actually followed by the primary spot on the physical surface of the object onto which the beam is projected.

The displacement of the effective spot in relation to the surface of the object can be carried out in accordance with a suitable track. That is, the real/primary spot, that is, the spot that is produced by the beam at any given moment, is scanned in accordance with the scanning pattern to create the effective spot, and this effective spot is displaced in accordance with the track. Thus, two types of movement are combined or overlaid: the movement of the primary spot in accordance with the scanning pattern (this movement is carried out with a velocity which is sometimes referred to as the "scanning velocity" or the "scanning speed"), and the movement of the effective spot in accordance with the track (which is carried out with a velocity sometimes referred to as the "process velocity" or the "process speed"), which in some embodiments of the disclosure can be a simple straight line and which in other embodiments can feature a more or less complex shape, including one or more curves, for example.

The term "two-dimensional energy distribution" refers to the manner in which the energy applied by the energy beam is distributed over the effective spot, for example, during one sweep of the beam along the scanning pattern. When the effective spot is projected onto a non-planar portion or area, such as a curved portion or area such as a portion or area featuring bends, the term "two-dimensional energy distribution" refers to how the energy is distributed along and across the surface of the object, that is, to the energy distribution along and across the effective spot as projected onto the surface of the object. The effective spot can be considered to have an extension and shape that corresponds to the area where there is a substantial application of energy during each sweep of the laser beam along the scanning pattern, for example, corresponding to the area where the energy density is at least 1% of the maximum energy density within the effective spot.

The method allows for a relatively rapid heating of a substantial area of the surface of the object, due to the fact that the effective spot can have a substantial size, such as, for example, more than 4, 10, 15, 20 or 25 times the size (area) of the primary spot. Thus, heating a certain region or area of the object to a desired extent in terms of temperature and duration can be accomplished more rapidly than if the heating is carried out by simply displacing the primary spot over the entire area, for example, following a sinusoidal or meandering pattern, or a straight line. The use of an effective spot having a relatively large area allows for high productivity while still allowing the relevant portion or portions of the surface to be heated for a relatively substantial amount of time, thereby allowing for, for example, less aggressive heating without compromising productivity.

The primary spot can have an area substantially smaller than the one of the effective spot. For example, in some embodiments of the disclosure, the primary spot has a size of less than 4 $mm^2$, such as less than 3 $mm^2$, at least during part of the process. The size of the primary spot can be modified during the process, so as to optimize the way in which each specific portion of the object is being heat treated, in terms of quality and productivity.

On the other hand, the use of an effective spot created by scanning the primary spot repetitively in two dimensions in accordance with a scanning pattern, makes it possible to establish an effective spot having a selected two-dimensional energy distribution, which is substantially independent of the specific optics (lenses, mirrors, etc.) being used, and which can be tailored and adapted to provide for an enhanced or optimized heating, from different points of view, including the speed with which the heat treatment is completed (for example, in terms of $cm^2$ per minute or in terms of terminated units per hour), and quality. For example, the heat can be distributed so that a leading portion of the effective spot has a higher energy density than a trailing portion, thereby reducing the time needed to reach a desired temperature of the surface, whereas the trailing portion can serve to maintain the heating for a sufficient amount of time to reach a desired depth and/or quality, thereby optimizing the velocity with which the effective spot can be displaced in relation to the surface of the object, without renouncing on the quality of the heat treatment. Also, the two-dimensional energy distribution can be adapted in relation to the sides of the effective spot, depending on the characteristics of the object, for example, so as to apply less heat in areas adjacent to an edge of the object or an opening in the object, where cooling due to heat transfer is slower, or so as to apply less heat in areas already featuring a relatively high temperature, for example, due to heating that has taken place recently. Also, the effective spot can be adapted in accordance to the tri-dimensional shape of the object, for example, to adapt the heating to the curvature, width, etc., of the object in the area being heated, and to the configuration of the portion of the object that is to be heated. The shape of the effective spot and/or the two-dimensional energy distribution can be adapted whenever needed, thereby adapting the process to the specific part of the object that is to be heated at any given moment. In some embodiments of the disclosure, the two-dimensional energy distribution can be varied as a function of the respective irradiation site on the object, taking into account, for example, the heat removal capability of a surrounding region. In some embodiments of the disclosure, the two-dimensional energy distribution can be varied taking into account desired characteristics of the object in different regions of the product, such as different requirements on hardness, rigidity, softness, ductility, etc.

Additionally, using the effective spot, created by the scanning of the primary spot in two dimensions, increases flexibility in terms of, for example, adaptation of a system to different objects to be produced. For example, the need to replace or adapt the optics involved can be reduced or eliminated. Adaptation can more frequently be carried out, at least in part, by merely adapting the software controlling the scanning of the primary spot and, thereby, the two-dimensional energy distribution of the effective spot.

In many prior art systems for heating an object using an energy beam, the area being heated at each moment substantially corresponded to the primary spot projected by the beam onto the surface. That is, in many prior art arrangements, the area being heated at each moment has a size that substantially corresponds to the one of the primary spot, and the width of the track being heated substantially corresponds to the width of the primary spot in the direction perpendicular to the direction in which the primary spot is being displaced, which in turn is determined by the source of the beam and the means for shaping it, for example, in the case of a laser, by the laser source and the optics used. Sometimes, the track is made wider by additionally oscillating the beam, for example, perpendicularly to the track. Of course, the present disclosure does not exclude the possibility of carrying out part of the heating operating with the primary spot in a conventional way. For example, the primary spot can be displaced to carry out the heating in correspondence with the outline or contour of a region to be heated, or to carry out heating of certain details of the object being heated, whereas the effective spot described above can be used to carry out the heating of other parts or regions of the object, such as the interior or main portion of a region to be heated. The skilled person will chose the extent to which the effective spot rather than the primary spot will be used to carry out the heating, depending on issues such as productivity and the need to carefully tailor the outline of a region to be heated or a certain portion of an object being subjected to heating.

That is, it is not necessary to use the effective spot to carry out all of the heating that has to take place during the process. However, at least part of the process is carried out using the effective spot described above. For example, it can be preferred that during at least 50%, 70%, 80% or 90% of the time during which the beam is applied to the object, it is applied so as to establish the effective spot as explained above, that is, by repetitively scanning the primary spot in accordance with the scanning pattern, this scanning being overlaid on the movement of the effective spot in relation to the object, that is, along the track.

The heating can be for the purpose of any kind of heat treatment, such as surface hardening, welding, solidification, etc. The object can be any suitable kind of object in any suitable form, including powder form or similar, which may often be the case in the context of additive manufacturing. For example, the object can be a sheet metal object, or any other kind of object. The object can be of metal or of any other material. The object does not have to be one single workpiece but can comprise several parts, for example, two or more parts to be welded together by the heating carried out fully or partly by the beam. Thus, the term "object" should not be interpreted in a narrow sense. The surface of the object can include openings or voids. This can, for example, occur when the surface comprises portions relating to different objects, where a space may exist between the objects. This is, for example, frequently the case when two parts are to be welded together, where one of the parts may be spaced from the other part in correspondence with at least part of the interface where a weld seam is to be established. In some embodiments, the surface is flat, whereas in other embodiments it features a three-dimensional shape.

In the present context, the expression dynamic adaptation is intended to denote the fact that adaptation can take place dynamically during displacement of the effective spot along the track. Different means can be used to achieve this kind of dynamic adaptation, some of which are mentioned below. For example, in some embodiments of the disclosure, the scanning system can be operated to achieve the dynamic adaptation (for example, by adapting the operation of galvanic mirrors or other scanning means, so as to modify the scanning pattern and/or the velocity of the primary spot along the scanning pattern or along one or more segments or portions thereof), and/or the beam power and/or the size of the primary spot can be adapted. Open-loop or closed-loop control can be used for controlling the dynamic adaptation. The dynamic adaptation can affect the way in which the energy is distributed within a given area of the effective spot, and/or the actual shape of the effective laser spot, and thus the shape—including the width—of the area being heated at any given moment (disregarding the fact that the primary spot is moving, and just considering the effective spot). For example, the length and/or the width of the effective spot can be adapted dynamically during the process. Thus, by this dynamic adaptation, the two-dimensional energy distribution can be different in relation to different portions of the surface of the object.

In some embodiments of the disclosure, the beam is displaced along said scanning pattern without switching the beam on and off and/or while maintaining the power of the beam substantially constant. This makes it possible to carry out the scanning at a high speed without taking into account the capacity of the equipment, such as a laser equipment, to switch between different power levels, such as between on and off, and it makes it possible to use equipment that may not allow for very rapid switching between power levels. Also, it provides for efficient use of the available output power, that is, of the capacity of the equipment in terms of power. Thus, adaptation of scanning speed and/or scanning pattern can often be preferred over adaptation of beam power. However, sometimes beam power is necessarily or preferably adapted, for example, to provide an appropriate energy flow (in terms of $J/m^2$) to a portion having a given width in the direction perpendicular to the track, without having to displace the effective spot at a non-appropriate velocity along the track and/or without (substantially or excessively) increasing the length of the effective spot. For example, it may be preferred not to operate the laser at its maximum power to allow the effective spot to travel at a velocity appropriate for the purpose of the heating (for example, in terms of hardening depth), without overheating the surface of the object.

In some embodiments of the disclosure, focus of the beam and/or the size of the primary spot are dynamically adapted during displacement of the primary spot along the scanning pattern and/or during displacement of the effective spot in relation to the surface of the object.

In some embodiments of the disclosure, the primary spot is displaced on the surface of the object in accordance with the scanning pattern with a first average velocity, and the effective spot is displaced in relation to the surface of the object with a second average velocity, the first average velocity being substantially higher than the second average velocity, such as at least 5, 10, 50, 100, 200, 500, 1000 or 2000 times the second average velocity. Here, the term "first average velocity" refers to the length of the scanning pattern projected onto the surface of the object divided by the time needed for the primary spot to complete one sweep along the scanning pattern, whereas the term "second average velocity" refers to the length of the track followed by the effective spot on the surface divided by the time needed for the effective spot to complete the track. A high velocity of the primary spot along the scanning pattern reduces the temperature fluctuations within the effective spot during each sweep of the primary spot along the scanning pattern. For example, for many laser surface hardening applications, a typical velocity of the effective spot along the track may be in the order of 600 mm/minute, whereas commercially available scanners suitable for this kind of processes may displace the primary spot projected onto the surface at velocities in the order of 25000 mm/s (and the use of this kind of velocities makes it possible to implement scanning patterns and effective spots with dimensions in the order of for example 20 mm×12 mm at the scanning frequencies in the order of 100 Hz sometimes used for laser hardening processes).

Additionally or alternatively, in some possible embodiments the size of the effective spot is more than 4 times the size of the primary spot, preferably more than 10 times the size of the primary spot, more preferably at least 25 times the size of the primary spot. In some embodiments of the disclosure, the size (that is, the area) of the effective spot, such as the average size of the effective spot during the process or the size of the effective spot during at least one moment of the process, such as the maximum size of the effective spot during the process, is more than 4, 10, 15, 20 or 25 times the size of the primary spot. For example, in some embodiments of the disclosure, a primary spot having a size in the order of 3 $mm^2$ can be used to create an effective spot having a size of more than 10 $mm^2$, such as more than 50 or 100 $mm^2$ or more. The size of the effective spot can be dynamically modified during the process, but a large average size can often be preferred to enhance productivity, and a large maximum size can be useful to enhance productivity during at least part of the process.

The method can be carried out under the control of electronic control means, such as a computer.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION OF THE DRAWINGS

Figure 1A:
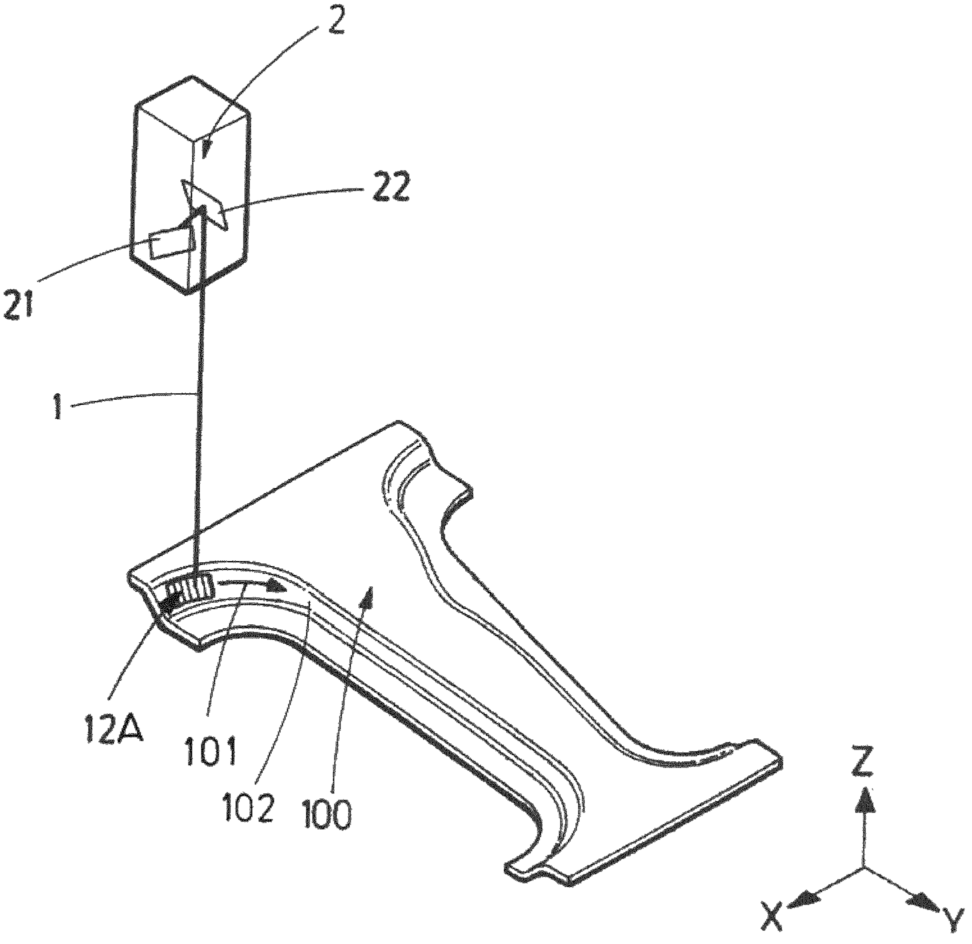
FIGS. 1A and 1B are perspective views schematically illustrating a system and method in accordance with one possible embodiment of the disclosure, for heat treatment of an object such as a vehicle pillar.
Figure 1B:
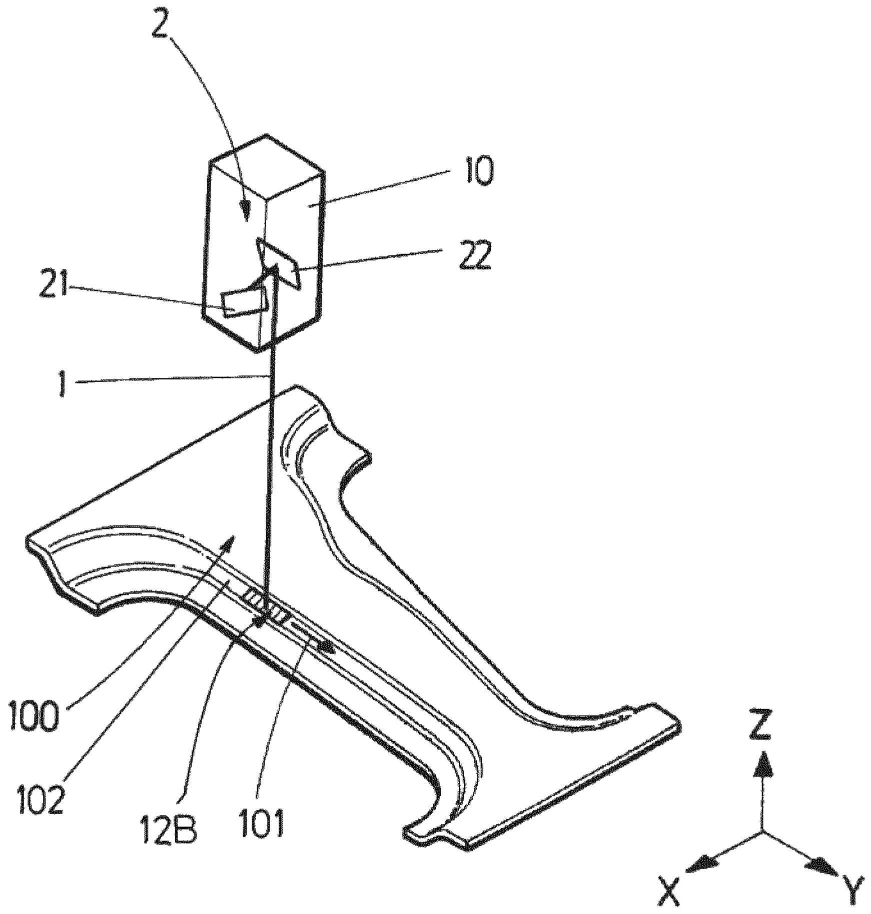

FIGS. 1A and 1B illustrate a system in accordance with one possible embodiment of the disclosure, in this case for heat treatment of a sheet metal object such as a vehicle pillar. The system comprises a laser head including a scanner 2 for directing a laser beam 1 onto a workpiece 100. The laser beam can be originated by a laser source remote from the laser head or within the laser head.

The laser beam 1 is projected onto the workpiece 100 to produce an effective spot 12A, 12B by repetitively scanning the laser beam (and thus the primary spot that the laser beam projects on the workpiece) in two dimensions, according to a scanning pattern. For this purpose, the laser head includes a scanner 2, such as a galvanometric scanner with two scanning mirrors 21 and 22, as schematically illustrated in FIGS. 1A and 1B. The scanning pattern followed by the primary spot projected by the laser beam 1 on the surface of the workpiece 100 at each specific moment is schematically illustrated as a set of parallel lines in FIGS. 1A and 1B. However, any other suitable scanning pattern can be used, including scanning patterns as known from WO-2015/135715-A1 referred to above, scanning patterns with curved segments, etc.

Thus, as known from for example WO-2016/146646-A1, the two-dimensional energy distribution within the effective spot 12A, 12B can be tailored by the choice of scanning pattern, velocity of the primary spot along the scanning pattern and along the different portions or segments thereof, beam power at each specific portion of the scanning pattern, size of the primary spot, etc. This allows for dynamic adaptation of the two-dimensional energy distribution so as to optimize the heat treatment. Thus, the two-dimensional energy distribution and the total power of the effective spot can be dynamically adapted as the effective spot travels along the track 101 to progressively heat a selected portion 102 of the workpiece 100, as schematically illustrated in FIGS. 1A and 1B.

As schematically illustrated in FIGS. 1A and 1B, the selected portion 102 to be heat treated has a width that varies along the track, and therefore the width of the effective spot is varied; it can be observed how the effective spot is wider in FIG. 1A than in FIG. 1B.

Figure 2A:
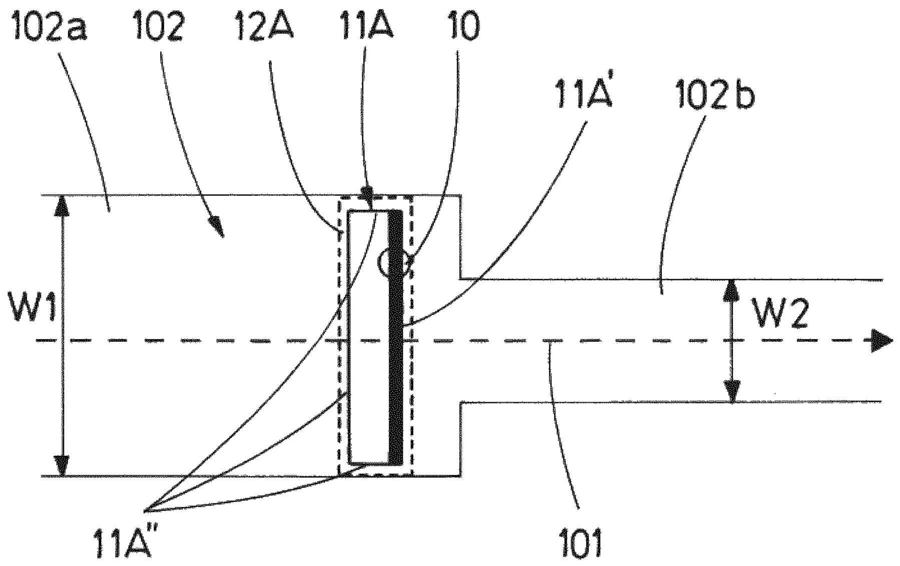
FIGS. 2A and 2B are top views schematically illustrating an embodiment of the disclosure.
Figure 2B:
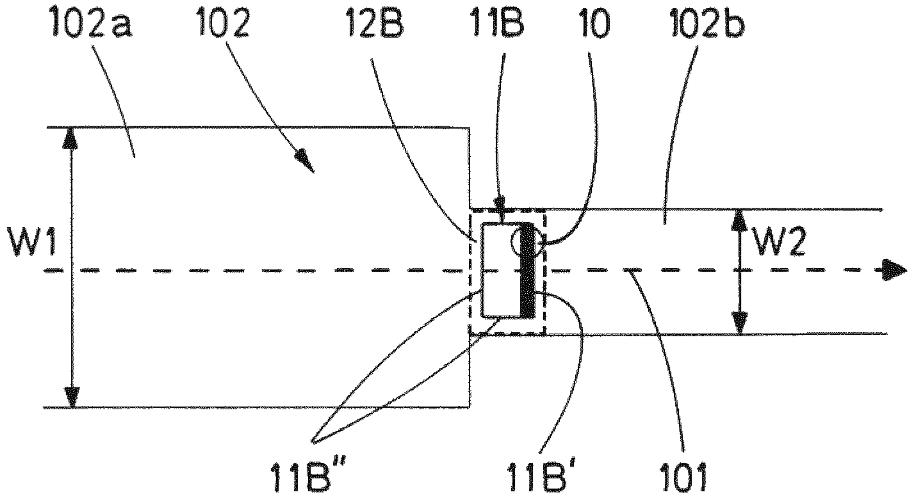

This concept is schematically illustrated in FIGS. 2A and 2B, showing another embodiment in which the effective spot 12A, 12B is likewise created by repetitively scanning the primary spot 10 along respective scanning patterns 11A, 11B, in correspondence with two different segments or sub-portions 102*a*, 102*b* of a strip or portion 102 of the workpiece to be heat treated. The effective spot is swept along a track 101 to progressively heat the two sub-portions 102*a*, 102*b*. The first sub-portion 102*a* has a first width W1 (in the direction perpendicular to the track), and the second sub-portion 102*b* has a second width W2 (in the direction perpendicular to the track). In the illustrated embodiment, the second width W2 of the second sub-portion is less than 50% of the first width W1 of the first sub-portion. Obviously, other embodiments feature other relations in width between the two sub-portions, sometimes including transition portions where the width increases or decreases progressively (rather than stepwise as in FIGS. 2A and 2B), etc.

In the case of the embodiment shown in FIGS. 2A and 2B, the scanning pattern is a simple scanning pattern with a rectangular shape. In practice, any suitable scanning pattern can be used, including complex scanning patterns including multiple lines and segments, including straight and/or curved segments. In the schematically illustrated embodiment, the primary spot 10 repetitively follows the scanning pattern 11A in correspondence with the sub-portion 102*a* having the first width W1, and the narrower scanning pattern 11B in correspondence with the sub-portion 102*b* having the second width W2, thereby determining the (varying) width of the portion of the object subjected to heat treatment in one sweep of the effective spot 12A, 12B along the track 101. In the illustrated embodiment, the effective spots 12A and 12B both feature an energy distribution with a leading portion featuring a higher energy density than the trailing portion. As explained in for example WO-2014/037281-A2 referred to above, this approach is sometimes preferred to allow for a rapid heating to a desired temperature by the leading edge or portion of the effective spot, whereafter the trailing portion serves to substantially maintain the temperature at the required level for a certain amount of time. In other embodiments, other energy distributions are used.

The higher energy density at the leading portion may for example be established by keeping the beam power constant while scanning the laser beam with a slower velocity along a leading segment 11A', 11B' of the respective scanning pattern, and with a higher velocity along trailing segments 11A", 11B". In other embodiments, the beam power can be adapted to achieve the same effect. In other embodiments, combinations of these approaches can be used, and/or other parameters can be changed. For example, and whereas FIGS. 2A and 2B schematically illustrate the use of one single basic scanning pattern layout (namely, a rectangular one), in other embodiments different scanning patterns may be used for the two sub-portions 102*a* and 102*b* of different width. For example, the scanning pattern used in the second and narrower sub-portion 102*b* may have a larger length in the direction parallel with the track, and the corresponding effective spot may move more rapidly along the track, than what is the case with the scanning pattern used in the first and wider sub-portion 102*a*.

In some embodiments the repetition rate of the narrower scanning pattern 11B is substantially the same as the repetition rate of wider scanning pattern 11A: for example, in some embodiments, the frequency of repetition of the narrower scanning pattern 11B in the sub-portion 102*b* having the narrower width W2 is more than 80% but less than 120% of the frequency of repetition of the scanning pattern 11A in the sub-portion 102*a* having the larger width W1. This also implies that the average velocity of the primary spot 10 along the scanning pattern 11A used in the sub-portion 102*a* having the larger width W1 (more than twice the width W2 of the second sub-portion) may be substantially higher than the average velocity of the primary spot 10 along the scanning pattern 11B used in the second sub-portion 102*b*. The average beam power may in many embodiments be higher in the sub-portion 102*a* having a larger width W1 than in the sub-portion 102*b* having a smaller width W2.

Figure 3A:
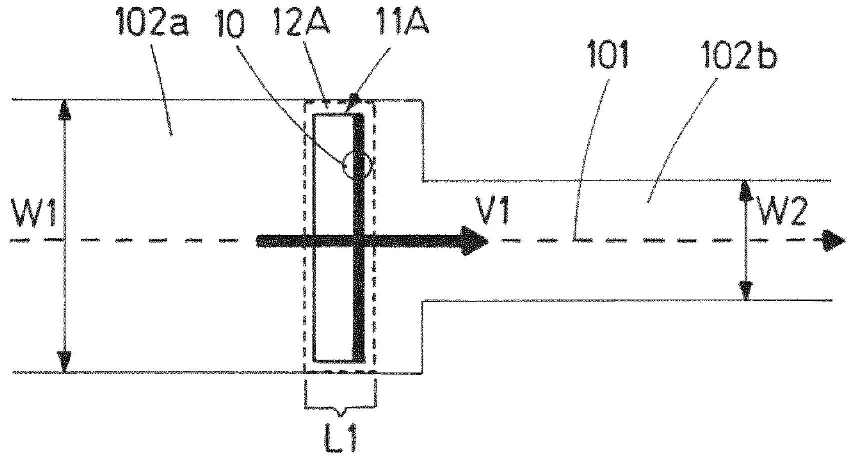
FIGS. 3A-3C schematically illustrate additional or alternative options for adapting the process to changes in the width of the portion to be heat treated, which can be used in accordance with different embodiments of the disclosure.
Figure 3B:
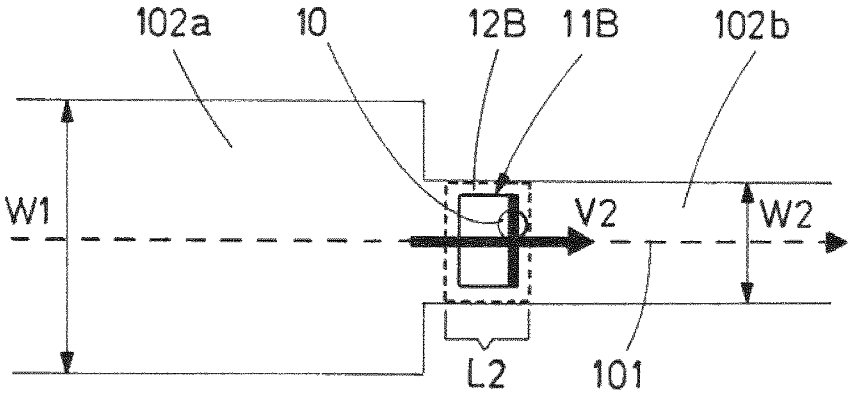
Figure 3C:
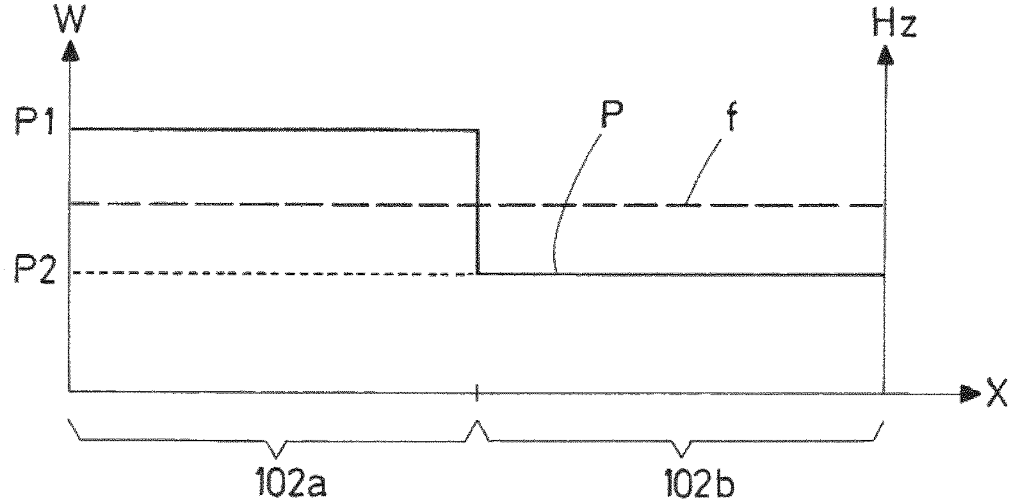

FIGS. 3A-3C schematically illustrate how adaptation of the process to different widths of the scanning pattern may involve the change in operation parameters such as the velocity V1/V2 with which the effective spot moves along the track (that is, the process velocity), the average beam power P1/P2, and/or the length L1/L2 of the effective spot. In different embodiments, these parameters may remain substantially constant, and in other embodiments some or more of them may change. For example, the average beam power may be chosen to be lower (P2) when applying heat treatment to a narrower sub-portion 102*b*, and higher (P1) when applying heat treatment to a wider sub-portion 102*a*. One reason for this is that when attempting to keep the radiation energy flow in terms of $J/m^2$ constant, if using the same average beam power in a narrower sub-portion as in a wider sub-portion, such as in the widest sub-portion, overheating may take place. For example, in the case of laser hardening, undesired melting may take place. Of course, one possibility of avoiding overheating could involve displacing the effective spot along the track using a higher velocity V2 along the narrower sub-portion 102*b* than along the wider sub-portion 102*a*, but that may have a negative impact in terms of quality, for example, in terms of hardening depth. In some embodiments, a higher velocity may be compensated by using an effective spot featuring a length L2 in the narrower sub-portion 102*b* that is larger than the length L1 of the effective spot in the wider sub-portion, the length being the extension of the effective spot in the direction parallel with the track. For example, additional segments of the scanning pattern can be added to make the scanning pattern longer and thereby distributing the energy over a larger surface, fully or partially compensating the reduced width of the portion being heated and/or the higher velocity with which the effective spot moves along the track. Thereby, a balance can be established between the desire the provide a substantially constant radiation energy flow in correspondence with the different sub-portions that are subjected to heat treatment, the desire to make efficient use of the available laser power (preferably operating at a relatively high power level, such as at or close to the maximum power level allowed by the chosen equipment), the need to achieve an appropriate product quality in terms of, for example, surface hardness or softness, depth affected by the treatment, etc., and the desire to operate at a high speed in terms heat treated product quantity (such as in units/hour, meters/minute, etc.).

Although it is considered that it is generally preferable to keep the frequency (that is, the repetition rate of the scanning pattern) substantially constant, in some embodiments also the frequency may vary substantially between a wider and a narrower sub-portion subjected to heating, although it may often be preferred that the frequency remains within a range of 80%-120% of a reference frequency.

Just as an example of the kind of calculations that may be involved when selecting the parameters for heat treatment of a sub-portion having a second width on the basis of the parameters chosen for a sub-portion having a first width (a “reference sub-portion”), the following example is given, assuming a rectangular scanning pattern and a constant beam power and scanning velocity (that is, not involving a leading portion with higher energy density):

Length of the first sup-portion (in the direction parallel with the track): LSP1=50 mm Width of the first sub-portion: W1=30 mm Length of the second sub-portion: LSP2=70 mm Width of the second sub-portion: W2=15 mm Beam power applied at the first sub-portion: P1=5000 W Beam power applied at the second sub-portion: P1=4000 W Diameter of the primary spot: d=5 mm Width of the scanning pattern at the first sub-portion: WS1=W1−d=25 mm Length of the scanning pattern (in the direction parallel with the track) at the first sub-portion: LS1=8 mm The first scanning patterns is repeated with a frequency (repetition rate) of F1=100 Hz Process velocity (the velocity of the effective spot in the direction parallel with the track) at the first sub-portion: PV1=600 mm/minute=10 mm/s The parameters applied to the first sub-portion can be considered to be reference parameters which have been found to provide for a desired product in terms of, just to give an example, hardening depth.

Now, the radiation energy flow EF1 at the first sub-portion can be calculated as follows:

$$\mathrm{EF1}=(P1*\mathrm{LSP1}/\mathrm{PV1})/((\mathrm{LSP1}-d)*W1+(W1-D)*d+\mathrm{PI}*(d/2)\hat{}2)\approx 16727\ \mathrm{kJ/m^2}$$

Now, the radiation energy flow at the second sub-portion EF2 shall be substantially the same as the radiation energy flow at the first sub-portion: EF2=EF1≈16727 $\mathrm{kJ/m^2}$ As the power P2 and the dimensions LSP2 and W2 are known, the process velocity PV2 at the second sub-portion can be calculated: PV2=(LSP2*P2)/[(((LSP2−d)*W2)+((W2−d)*d)+(PI*(d/2)^2)))*EF2)]≈961 mm/minute≈16 mm/s However, as explained above, it is also preferred that also the radiation energy flow (in terms of $\mathrm{J/m^2}$) of the scanning patterns be the same at the first and the second sub-portion: EFS1=EFS2.

EFS1 corresponds to the amount of energy applied during one sweep of the primary spot along the scanning pattern, divided by the surface area swept by the primary spot:

The amount of energy applied during one sweep of the primary spot along the scanning pattern is P1/F1=50 J. The area swept is (((LS1*2)+(WS1*2))*d)+(PI*(d/2)^2)≈350 $\mathrm{mm^2}$. Thus, the radiation energy flow of the first scanning pattern EFS1≈143 $\mathrm{kJ/m^2}$. Thus, the parameters for the scanning in correspondence with the second sub-portion are to be selected so that EFS2=EFS1≈143 $\mathrm{kJ/m^2}$.

With the beam power, spot diameter, frequency (repetition rate) and width of the sub-portion known, the remaining parameter to be adjusted is the length of the second scanning pattern, LS2. The amount of energy applied during one sweep of the primary spot along the scanning pattern is P2/F2=P2/F1=40 J. If the area that is swept by the primary spot during one scanning cycle is A $\mathrm{m^2}$, 40/A=143006, that is, A≈40/143006≈0.000280 $\mathrm{m^2}$, that is, 280 $\mathrm{mm^2}$.

Figure 4A:
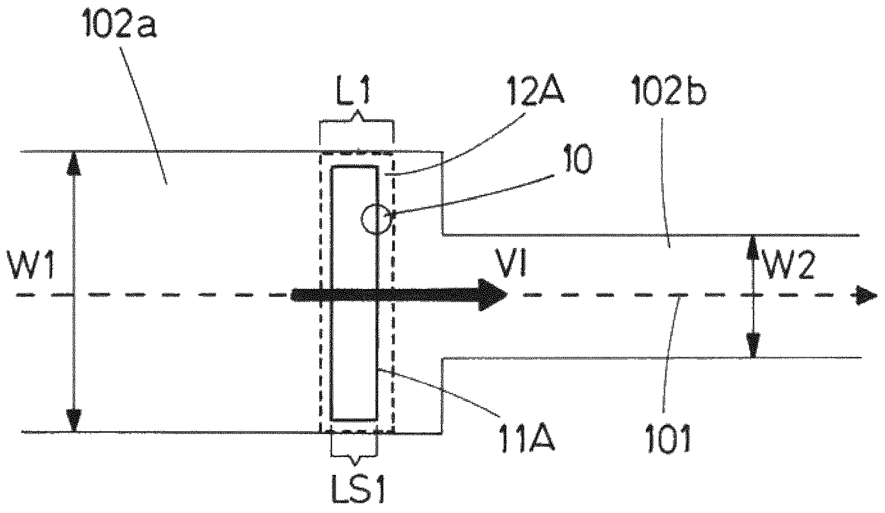
FIGS. 4A and 4B schematically illustrate an embodiment of the disclosure using scanning patterns having different lengths and different widths in the direction parallel with and perpendicular to the track, respectively.
Figure 4B:
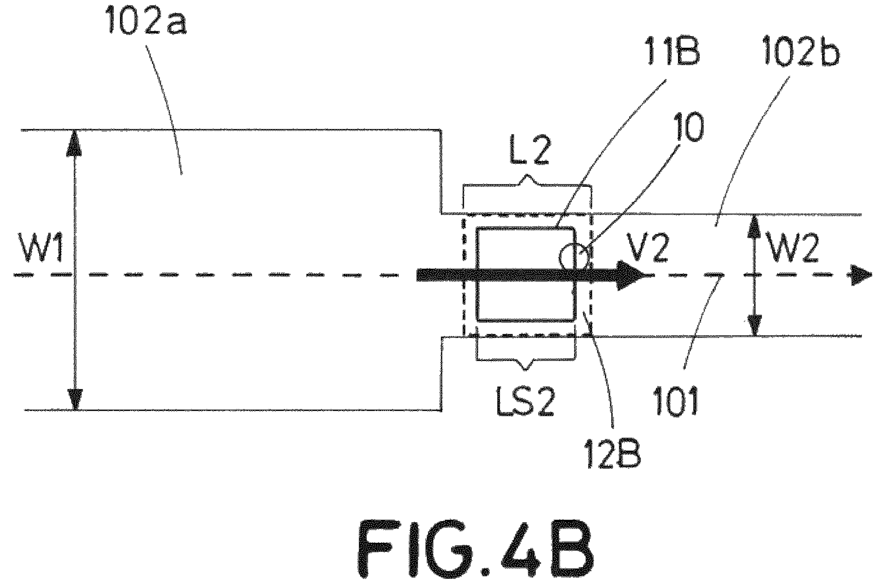

The area swept is (((LS2*2)+(WS2*2))*d)+(PI*(d/2)^2) =((2*10+2*LS2)*5)+(PI*(5/2)^2)=100+10LS2+(PI*(5/2)^2) ($\mathrm{mm^2}$). Thus, LS2=((280−(PI*(d/2)^2))/d)−(100))/10) mm≈16 mm. That is, the length of the second scanning pattern in the direction parallel with the track will be longer than the length of the first scanning pattern in the direction parallel with the track, and the same applies to the extension of the effective spot along the track. This concept is schematically illustrated in FIGS. 4A and 4B, showing a layout similar to the one of FIGS. 2A and 2B but with the second scanning pattern 12B having a length or extension LS2 substantially larger than the length or extension LS1 of the first scanning pattern 12A (in the direction parallel with the track 101). There is a corresponding difference in the lengths of the corresponding effective spots (that is, L2>L1).

This is just an example of how, on the basis of the parameters selected for the heat treatment of the first sub-portion having the width W1, and based on the condition that the radiation energy flows (in terms of $\mathrm{J/m^2}$) are to be kept constant both in what regards the radiation energy flow applied to the heated sub-portion and in what regards the radiation energy flow of the scanning pattern (that is, the energy applied during one sweep of the primary spot along the scanning pattern divided by the area actually swept by the primary spot), the length of the second scanning pattern can be determined for a given power level.

These calculations are based on a simple rectangular scanning pattern with constant beam power and scanning velocity and thus with an even distribution of the energy along the scanning pattern. If a more complex pattern/energy distribution is used, such as one with a higher energy density in correspondence with a leading portion than in correspondence with a trailing portion, the calculations can be carried out separately for the leading and the trailing portions, and the condition that the radiation energy flow is to be constant has to be complied with both for the leading portions and for the trailing portions.

Figure 5A:
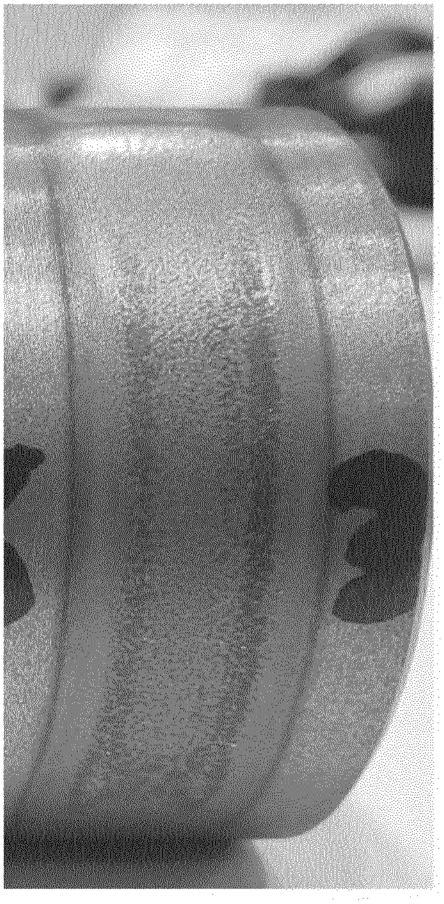
FIGS. 5A and 5B are photographs of tracks that have been laser hardened on circular steel rods, using different scanning frequencies.
Figure 5B:
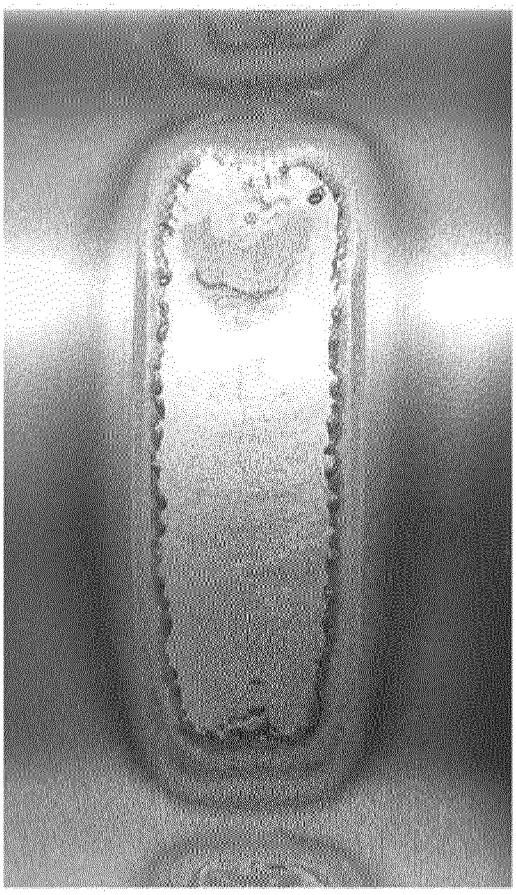

FIGS. 5A and 5B are photographs of tracks that have been hardened on a circular steel rod. In both cases, the heat treatment took place using a rectangular scanning pattern with a size of 10 mm×8 mm, a beam power of 2000 W, and a process velocity of 200 mm/min. The difference between the heat treatments corresponding to FIGS. 5A and 5B is that in the heat treatment corresponding to FIG. 5A, the frequency (repetition rate) of the scanning pattern was 100 Hz, whereas in the heat treatment corresponding to FIG. 5B, the frequency (repetition rate) of the scanning pattern was 250 Hz. It was observed that when the higher frequency (250 Hz) was used, re-melting took place (FIG. 5B), whereas no re-melting to place when the lower frequency (100 Hz) was used.

It should be observed that the different specific scanning patterns discussed above and illustrated in the respective drawings are in no way intended to represent scanning patterns that are adequate or optimized for the described purposes. They are merely intended to schematically illustrate the concept of using scanning patterns in accordance with the disclosure and adapting them in accordance with the specific two-dimensional energy distribution that is selected at each specific moment, so as to produce the heating in the desired manner. The person skilled in the art will typically choose suitable scanning patterns using simulation software and trial-and-error approaches.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A method of heating at least one selected portion of an object, the method including the following steps:

projecting an energy beam onto a surface of the object so as to produce a primary spot on the surface, and repetitively scanning the energy beam in two dimensions in accordance with a scanning pattern so as to establish an effective spot on the surface, the effective spot having a two-dimensional energy distribution, and displacing the effective spot along a track on the surface of the object to progressively heat a selected portion of the object;

wherein the selected portion has a first width at a first position along the track, and a second width at a second position along the track, the first width being larger than the second width;

wherein the energy beam is scanned in accordance with the scanning pattern so that the scanning pattern is repeated by the energy beam with a first frequency in correspondence with the first position along the track, and with a second frequency in correspondence with the second position along the track, and wherein both of the first frequency and the second frequency are larger than 10 Hz, wherein the effective spot has a length in the direction parallel with the track that is smaller in correspondence with the first position than in correspondence with the second position, and wherein the effective spot is displaced along the track with a first velocity in correspondence with the first position along the track, and with a second velocity in correspondence with the second position along the track, the second velocity being higher than the first velocity.

2. The method according to claim 1, wherein the energy beam has a first average power in correspondence with the first position along the track, and a second average power in correspondence with the second position along the track, the second average power being identical to the first average power.

3. The method according to claim 1, wherein the second width is less than 90% of the first width.

4. The method according to claim 3, wherein the second width is less than 75% of the first width.

5. The method according to claim 1, wherein the second frequency is more than 60% of the first frequency and less than 140% of the first frequency.

6. The method according to claim 5, wherein the second frequency is more than 70% of the first frequency.

7. The method according to claim 6, wherein the second frequency is less than 130% of the first frequency.

8. The method according to claim 1, wherein the energy beam is a laser beam.

9. A system for heating at least one selected portion of an object, the system comprising:

means for producing an energy beam and for projecting the energy beam onto a surface of the object, and a scanner for scanning the energy beam in at least two dimensions;

wherein the system is programmed for carrying out the method of claim 1.

10. The method according to claim 1, wherein the effective spot features a first radiation energy flow onto the surface of the object in correspondence with the first position along the track, and a second radiation energy flow onto the surface of the object in correspondence with the second position along the track, the second radiation energy flow being not more than 140% of the first radiation energy flow, and not less than 60% of the first radiation energy flow.

11. The method according to claim 10, wherein the first scanning pattern represents a third radiation energy flow defined as the energy supplied by the beam during one sweep along the first scanning pattern divided by the surface area swept by the primary spot during that one sweep along the first scanning pattern, and wherein the second scanning pattern represents a fourth radiation energy flow defined as the energy supplied by the beam during one sweep along the second scanning pattern divided by the surface area swept by the primary spot during that one sweep along the second scanning pattern, wherein the third radiation energy flow is identical to the fourth radiation energy flow.

12. The method according to claim 11, wherein the second radiation energy flow is not more than 120% of the first radiation energy flow, and not less than 80% of the first radiation energy flow, and wherein the fourth radiation energy flow does not differ from the third radiation energy flow by more than 20%.

13. The method according to claim 12, wherein the second radiation energy flow is not more than 110% of the first radiation energy flow, and not less than 90% of the first radiation energy flow, and wherein the fourth radiation energy flow does not differ from the third radiation energy flow by more than 10%.

14. The method according to claim 13, wherein the second radiation energy flow is not more than 105% of the first radiation energy flow, and not less than 95% of the first radiation energy flow, and wherein the fourth radiation energy flow does not differ from the third radiation energy flow by more than 5%.

15. A method of heating at least one selected portion of an object, the method including the following steps:

projecting an energy beam onto a surface of the object so as to produce a primary spot on the surface, and repetitively scanning the energy beam in two dimensions in accordance with a scanning pattern so as to establish an effective spot on the surface, the effective spot having a two-dimensional energy distribution, and displacing the effective spot along a track on the surface of the object to progressively heat a selected portion of the object;

wherein the selected portion has a first width at a first position along the track, and a second width at a second position along the track, the first width being larger than the second width;

wherein the energy beam is scanned in accordance with the scanning pattern so that the scanning pattern is repeated by the energy beam with a first frequency in correspondence with the first position along the track, and with a second frequency in correspondence with the second position along the track, and wherein both of the first frequency and the second frequency are larger than 10 Hz; and wherein the method comprises making the effective spot longer in correspondence with a narrower sub-portion to be heat treated than in correspondence with a wider sub-portion, so that the effective spot has a length in the direction parallel with the track that is smaller in correspondence with the first position than in correspondence with the second position.

16. The method according to claim 15, wherein the effective spot is displaced along the track with a first velocity in correspondence with the first position along the track, and with a second velocity in correspondence with the second position along the track, the second velocity being higher than the first velocity.

17. The method according to claim 16, wherein the effective spot features a first radiation energy flow onto the surface of the object in correspondence with the first position along the track, and a second radiation energy flow onto the surface of the object in correspondence with the second position along the track, the second radiation energy flow being not more than 140% of the first radiation energy flow, and not less than 60% of the first radiation energy flow.

18. The method according to claim 17, wherein the first scanning pattern represents a third radiation energy flow defined as the energy supplied by the beam during one sweep along the first scanning pattern divided by the surface area swept by the primary spot during that one sweep along the first scanning pattern, and wherein the second scanning pattern represents a fourth radiation energy flow defined as the energy supplied by the beam during one sweep along the second scanning pattern divided by the surface area swept by the primary spot during that one sweep along the second scanning pattern, wherein the third radiation energy flow is identical to the fourth radiation energy flow.

19. The method according to claim 15, wherein making the effective spot longer and reducing the width of the effective spot takes place in response to a reduction in the width of the sub-portion to be heat treated.

* * * * *